Dec. 18, 1951 L. G. ABRAHAM 2,579,285
TRANSMISSION LINE DISTORTION CORRECTOR
Filed Aug. 13, 1949
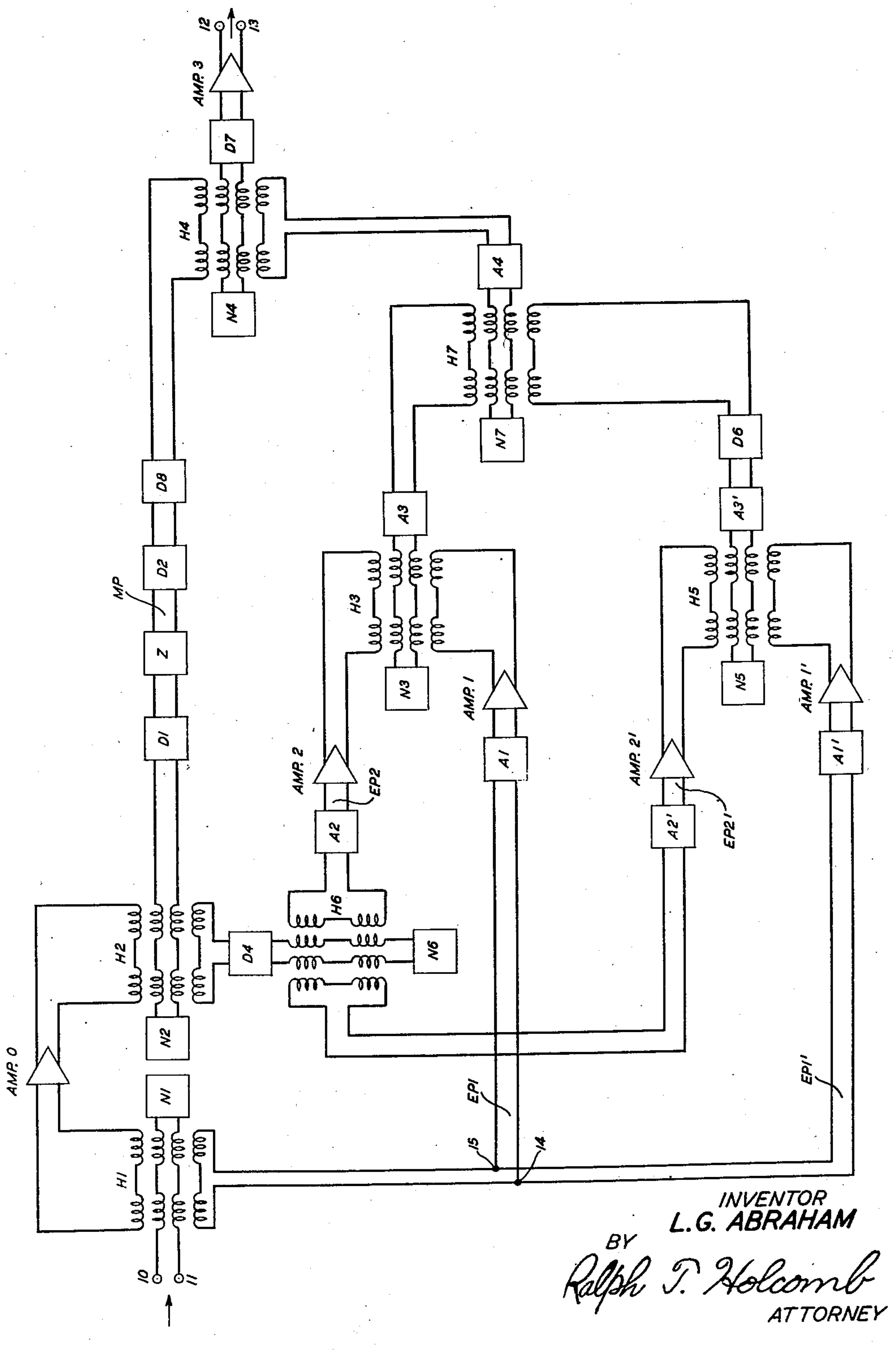
INVENTOR
L. G. ABRAHAM
BY
Ralph T. Holcomb
ATTORNEY Patented Dec. 18, 1951 2,579,285

UNITED STATES PATENT OFFICE 2,579,285

TRANSMISSION LINE DISTORTION CORRECTOR

Leonard G. Abraham, Madison, N. J., assignor to Bell Telephone Laboratories, Incorporated, New York, N. Y., a corporation of New York Application August 13, 1949, Serial No. 110,079

14 Claims. (Cl. 178—44)

This invention relates to wave transmission and more particularly to the correction of a sinusoidal gain or phase distortion.

The principal object of the invention is to eliminate or correct a sinusoidal departure or deviation in either the gain or the phase characteristic of a transmitted signal wave.

Further objects are to correct gain distortion without affecting the phase, or to correct phase distortion without affecting the gain.

Another object is to make a distortion corrector easily adjustable.

When a signal wave is transmitted over even a high grade transmission line it is usually distorted to a certain extent in amplitude, in phase, or in both. Much of this distortion can be corrected by means of ordinary attenuation equalizers and phase correctors. However, especially on long circuits, there generally remains uncorrected sinusoidal distortion giving rise to one or more echoes which may be very undesirable, for example, in broadband transmission systems such as are required for television.

In accordance with the present invention this sinusoidal distortion in gain or phase is reduced or eliminated by means of a distortion corrector in the form of a four-terminal transducer through which the signal wave is passed. The basic principle involved is the creation within the transducer of new echoes, derived from the signal wave, to cancel out the echoes originating in the transmission line.

In the embodiment shown the distortion corrector comprises essentially a number of parallel transmission paths between the input terminals and the output terminals. One of these is the main transmission path over which the major portion of the input energy is transmitted with little or no distortion but is delayed for a predetermined time by means of a delay device. Located in the main path on the output side of the delay device is an impedance discontinuity which reflects part of the energy back through the delay device. This reflected wave is taken off from the main path and transmitted through an echo path. Undelayed energy is transmitted through another echo path. The waves from the main path and the two echo paths are combined at the output terminals to provide a main wave and a pair of equal echoes which arrive at equal intervals of time, respectively, ahead of and behind the main wave. These echoes set up a sinusoidal deviation which may be adjusted to cancel out a sinusoidal gain or phase deviation in the input signal, depending upon the phasing of the echo paths. An important feature of the distortion corrector is that equal spacing of the echoes is assured by using only a single delay device followed by a reflecting impedance. The main wave passes through the delay device once but one of the echo waves transverses it twice. Therefore, it is unnecessary to provide two separate delay devices one of which must have exactly twice the delay of the other.

The period, or frequency interval between the successive maxima, of the correction characteristic may be adjusted by changing the delay introduced by the delay device in the main path. However, if the zeroes of the correction characteristic do not correspond with those of the distortion characteristic an additional adjustment of the distortion corrector must be provided. This may take the form of a variable phase shifter having zero delay inserted in one of the echo paths. Alternatively, two auxiliary echo paths, branching, respectively, from the first two echo paths, may be provided. The waves from these auxiliary paths are combined and shifted in phase by $\pi/2$ radians to provide a second pair of echoes which have the same spacing as, but are $\pi/2$ radians out of phase with, the pair of echoes from the first two echo paths. Means are provided for adjusting the relative amplitudes of these two pairs of echoes so that the zeroes of the correction characteristic coincide with the zeroes of the distortion characteristic. The two pairs of echoes are then combined with the main wave either to correct a sinusoidal gain distortion without affecting the phase characteristic, or to correct a sinusoidal phase distortion without affecting the gain, depending upon the poling of the echo paths. It is assumed that the echoes in the input signal wave are so weak that any echoes of the echoes may be neglected.

In general, if it is desired to correct for both gain and phase distortion, two distortion correctors of the type described are used in tandem. One is adjusted for gain correction and the other for phase correction. However, if they have the proper relationship to each other in their periods and zeroes, various mixtures of gain and phase distortion may be compensated in a single corrector.

Amplifiers or hybrid coils will, in general, be required at appropriate points in the circuit to prevent interaction between the various transmission paths. Also, additional delay devices, phase correctors, attenuation equalizers and attenuators may, under certain circumstances, be advantageously included to solve special distortion correction problems. These will be described in the detailed description below. If certain of these component elements are made variable the distortion corrector may easily be adjusted to provide any desired sinusoidal correction characteristic.

The nature of the invention will be more fully understood from the following detailed description and by reference to the accompanying drawing, in which like reference characters designate similar or corresponding parts and the single figure of which is a schematic circuit showing one embodiment of a distortion corrector in accordance with the invention.

In the embodiment shown, the distortion corrector comprises five parallel transmission paths, some having common portions, between a pair of input terminals 10, 11 and a pair of output terminals 12, 13. These are the main path MP, first and second echo paths EP1 and EP2, and first and second auxiliary echo paths EP1′ and EP2′, as indicated in the figure. The distorted signal to be corrected is applied to the input terminals 10, 11, as indicated by the arrow at the left, and the corrected signal is taken off at the output terminals 12, 13, as indicated by the arrow at the right.

The main transmission path MP may be traced from the input terminals 10, 11 through hybrid coil H1, amplifier 0, hybrid coil H2, delay device D1, reflecting impedance Z, delay devices D2 and D8, hybrid coil H4, network D7 and amplifier 3 to the output terminals 12, 13. The total gain and phase shift of this path must be substantially distortionless. The network D7 and amplifier 3 are provided to remove any distortion which may have been introduced in the main path.

The first echo path EP1 branches off from the main path MP at hybrid coil H1, goes through attenuator A1, amplifier 1, hybrid coil H3, network A3, hybrid coil H7 and network A4, and recombines with the main path at hybrid H4 to provide an undelayed component, the amplitude of which is controlled by the settings of A1 and A3.

The function of the reflecting impedance Z is to reflect a portion of the energy in the main path MP and provide an echo for transmission over the second echo path EP2, which branches from the main path at the hybrid coil H2. The impedance Z is designed to give a considerable reflection without introducing undesired distortion and may be a shunt impedance, a series impedance, or any suitable transducer. The transmission loss in the main path MP caused by Z is made up by later elements. The current reflected at Z passes through D1 a second time and divides at hybrid coil H2, half being dissipated in the output of amplifier 0 and the other half entering the echo path EP2. A function of hybrid H2 is to prevent undelayed energy in the main path MP from entering the second echo path EP2, which may be traced from H2 through delay device D4, hybrid coil H6, attenuator A2 and amplifier 2 to hybrid coil H3, where it joins the first echo path EP1 and finally unites with the main path MP at hybrid H4.

In the circuit so far described, if it is first assumed that the delays D2, D4 and D8 are zero, it will be seen that the energy reaching the output terminals 12, 13 will consist of a main wave and two echoes, one of which will precede the main wave by an interval $d_1$ equal to the delay in $D_1$ and the other of which will follow the main wave by the same interval. By a proper adjustment of amplifiers 1 and 2 and attenuators A1 and A2 these echoes may be made equal in magnitude. For a given poling of the echo paths EP1 and EP2, such a pair of echoes will produce a sinusoidal gain departure, without introducing any phase distortion, in the signal transmitted through the corrector. If the poling is changed, for example, by putting in a turnover at the input or output of either A1 or A2, there is provided a sinusoidal phase departure without any gain distortion. The magnitude of these departures may be adjusted as desired by changing the attenuation introduced by A3. Also, the magnitude of these departures can be changed, if required, over the frequency range of interest by providing a suitable gain-frequency characteristic in the network A3. The maximum departures may be changed to minima, and vice versa, by a simple turnover at the input or the output of A3.

In some cases it will be found desirable to divide the delay in the main path MP between the two delay devices D1 and D2, in which case D4 in the second echo path EP2 is designed to have twice the delay of D2. If certain parts of the frequency band are relatively unimportant, this permits D2 to be cheapened, as compared with D1, and any phase distortion thereby introduced into the main path MP may be corrected in the network D7. In some instances D7 may be omitted entirely.

The period $p$ of the sinusoidal correction characteristic, that is, the frequency interval between successive gain or phase maxima or between alternate zeroes, is $$p=\frac{1}{d_1+d_2} \qquad (1)$$

where $d_1$ and $d_2$ are, respectively, the delays of the devices $D_1$ and $D_2$. This period may be adjusted, as required, by changing either $d_1$ or $d_2$, to coincide with the period of the distortion characteristic to be corrected. However, in the distortion corrector so far described, the zeros of the correction characteristic may not coincide in frequency with those of the distortion characteristic. Therefore, additional means must, in general, be included to bring about the desired coincidence. One way of accomplishing this is to introduce into the delay device $D_4$ a variable phase shift which has zero delay, that is, one which is independent of frequency.

Another, and possibly less expensive, way of providing the desired coincidence of zeroes is to add two auxiliary echo paths branching, respectively, from the two echo paths EP1 and EP2 already described. One of these, EP1′, branches off from the first echo path EP1 at the points 14, 15, goes through attenuator $A_1'$, amplifier 1′, hybrid coil H5, network $A_3'$ and phase shifter D6, and combines with the first two echo paths EP1 and EP2 at hybrid H7. The second auxiliary echo path EP2′ branches off from the second echo path EP2 at hybrid H6, goes through attenuator A2′ and amplifier 2′, and joints the first auxiliary echo path EP1′ at hybrid H5. The phase shifter D6 has a fixed phase shift of $\pi/2$ radians over the frequency range of interest, but substantially no delay. It will be apparent that the sinusoidal correction characteristic introduced by the first pair of echo paths EP1 and EP2 will have the same period as that of the correction characteristic introduced by the auxiliary echo paths EP1' and EP2', but the two characteristics will be $\pi/2$ radians out of phase with each other. Therefore, by adjusting the relative magnitudes of the attenuations introduced by attenuators A3 and A3' the resultant correction characteristic can be adjusted so that its zeroes coincide with the zeroes of the distortion characteristic of the signal to be corrected. Either gain or phase distortion can be corrected, depending upon the poling of the echo paths, as explained above.

If the delay associated with the phase shifter D6 is not small enough to be negligible, the delay may be compensated by introducing into the main path a delay device D8 having an equal delay. In some cases it will be found more economical to build D6 with delay and add D8.

The networks N1 to N7 associated, respectively, with the hybrid coils H1 to H7 are ordinary balancing networks. The functions of the amplifiers 0, 1, 1', 2, 2' and 3 are to reduce the balance requirements on the hybrid coils and to provide an adjustment of the signal levels in the different branches in order to avoid too much noise. Part or all of these amplifiers may, under certain circumstances, be omitted. For example, a function of the amplifier 0 is to prevent energy in the main path MP reflected by the impedance Z from entering the first echo path EP1 through hybrid coil H1 and, therefore, this amplifier may be omitted if the balance across hybrid H1 is sufficiently high that the reflected energy from the path MP passing through it to the path EP1 is negligible. On the other hand, when the amplifiers are included in the circuit part or all of the hybrid coils may, in some cases, be omitted. If the transmission loss in the four echo paths remains sufficiently stable the attenuators A1, A1', A2 and A2' can be fixed pads. In this case any necessary loss adjustments are made in the variable attenuations A3 and A3'. Under certain circumstances the attenuation characteristics of one or all of the networks A3, A3' and A4 may advantageously be made frequency dependent.

The above discussion has assumed that the distortion to be corrected has been either pure gain or pure phase. On this basis, in order to compensate for both gain and phase distortion two tandem-connected correctors are required. One is adjusted to compensate for the gain distortion and the other to eliminate phase distortion. It should be pointed out, however, that, if they have the proper relationship to each other with respect to their periods and zeroes, various mixtures of gain and phase distortion may be taken care of in a single corrector by adjusting the relative values of the losses through the different echo paths. Also, a number of correctors may be used in tandem to correct for sinusoidal distortion characteristics having different periods.

In practice, the optimum settings for the component networks of the distortion corrector may be determined experimentally by applying the distorted signal to the input, trying different delays, and varying the attenuators until good compensation is obtained, as evidenced by the resultant gain or phase characteristic. It will be assumed, for example, that a sinusoidal phase distortion is to be corrected. First, with the attenuator A3' set at a high value, attenuators A1 and A2 are adjusted relative to each other until the over-all gain characteristic is flat. This gives the correct settings for A1 and A2. Then the settings for A1' and A2' are found by making the attenuation of A3 high and adjusting A1' and A2' relative to each other until the gain characteristic is again flat. Then the zeroes of the correction characteristic are properly positioned in frequency by adjusting the relative values of the attenuation of the networks A3 and A3'. It may be found that a turnover in one of the paths is required in order to interchange the maxima and the minima. Finally, the required maximum phase deviation is secured by adjusting the attenuation of the network A4.

If the echoes to be eliminated are of the minimum phase type, having corresponding gain and phase characteristics, only the second echo path EP2 and the second auxiliary echo path EP2', carrying the delayed echoes, are required to provide perfect compensation. In this case the echo paths EP1 and EP1', carrying the undelayed components, may be omitted.

If desired, the proper settings of certain of the component networks may be calculated, as shown by the following illustrative example. It is assumed that the circuit to be corrected has a sinusoidal phase distortion characteristic with an amplitude of $\pm 0.1$ radian over the frequency range of interest and a period $p$ of 1 megacycle, with the first zero of interest occurring at 300 kilocycles. From Equation 1 the sum of the delays $d_1$ and $d_2$ in the delay devices D1 and D2 will be $$d_1+d_2=\frac{1}{p}=\frac{1}{10^6}\text{ second}=1\text{ microsecond} \quad (2)$$

Now, assuming $d_2$ is chosen as 0.5 microsecond, $$d_1=1-0.5=0.5\text{ microsecond} \quad (3)$$

and the delay of D4 will be $2d_1$ or 1 microsecond. With these values, the total delay in the main transmission path MP will be 1 microsecond, in the first echo path EP1 and the first auxiliary echo path EP1' will be zero, and in the other two echo paths EP2 and EP2' will be $$2(0.5)+1=2\text{ microseconds} \quad (4)$$

Now, if $K_1$ is the transmission loss in decibels in each of the first and second echo paths EP1 and EP2 relative to the loss in the main path MP and $K_2$ is the loss in each of the auxiliary echo paths EP1' and EP2' relative to that in MP, we may write $$K_1=-20\log k_1 \quad (5)$$

$$K_2=-20\log k_2 \quad (6)$$

where $k_1$ and $k_2$ are the output to input current ratios corresponding, respectively, to the losses $K_1$ and $K_2$.

The waves in the four echo paths unite in hybrid coil H7 to produce a sinusoidal phase deviation or wobble characteristic B which may be expressed as $$B=2\sqrt{k_1^2+k_2^2}\sin\left(2\pi f d_1+2\pi f d_2+\arctan\frac{k_2}{k_1}\right) \quad (7)$$

where $f$ is the frequency. The period of this wobble is given by Equation 1. Its amplitude in radians is $$2\sqrt{k_1^2+k_2^2}$$

so we have $$2\sqrt{k_1^2+k_2^2}=0.1 \quad (8)$$

The zeroes of this phase characteristic will occur where $$2\pi f_n(d_1+d_2)+\arctan\frac{k_2}{k_1}=n\pi \quad (9)$$

where $n$ is any integer. Equation 9 may be written $$k_2=k_1 \tan \pi[n-2f_n(d_1+d_2)] \quad (10)$$

from which, when $$n=1, f_n=3\times10^5 \text{ and } d_1+d_2=10^{-6}$$

$$k_2=k_1 \tan 0.4\pi=3.077\ k_1 \quad (11)$$

Solving Equations 8 and 11 for $k_1$ and $k_2$ gives $$k_1=0.0154 \quad (12)$$

$$k_2=0.0474 \quad (13)$$

and from Equations 5 and 6

$$K_1=36.2 \text{ decibels} \quad (14)$$

$$K_2=26.5 \text{ decibels} \quad (15)$$

Therefore, the network A3 is so set that the transmission loss in each of the first and second echo paths EP1 and EP2 is 36.2 decibels greater than the loss in the main path MP, and the attenuator A3' is set to provide a loss in each of the auxiliary echo paths EP1' and EP2' which is 26.5 decibels greater than that in the main path. With these settings, the phase correction characteristic will have the proper period and amplitude and correctly placed zeroes and, therefore, with proper poling of the various paths, the phase distortion will be eliminated without affecting the gain characteristic.

If the amplitude of the phase distortion characteristic differs over the frequency range to be covered, values of $K_1$ and $K_2$ are found at a number of different frequencies and used to determine the gain-frequency characteristics to be furnished by the networks A3 and A3', respectively.

It is also possible to use maximum values of the phase departure to determine the relative values of $k_1$ and $k_2$ by substituting $$\frac{4n-1}{2}\pi$$

for $n\pi$ in Equation 9, or minimum values by substituting $$\frac{4n-3}{2}\pi$$

For example, a maximum in the above example will occur at $$300+\frac{1000}{4}=550 \text{ kilocycles}$$

Then, by analogy with Equations 9 and 10

$$2\pi f_n(d_1+d_2)+\text{arc tan } \frac{k_2}{k_1}=\frac{4n-1}{2}\pi \quad (16)$$

and $$k_2=k_1 \tan \pi\left[\frac{4n-1}{2}-2f_n(d_1+d_2)\right] \quad (17)$$

For $$n=1,\ f_n=5.5\times10^5 \text{ and } d_1+d_2=10^{-6}$$

$$k_2=k_1 \tan \pi(1.5-1.1)=k_1 \tan 0.4\pi \quad (18)$$

which is the same as Equation 11 above.

What is claimed is:

1. A distortion corrector comprising a pair of input terminals, a pair of output terminals, a main transmission path between said input terminals and said output terminals, a delay device in said path, a reflecting impedance in said path located between said delay device and said output terminals, a first echo path from said input terminals to said output terminals, a second echo path from a point in said main path between said delay device and said input terminals to said output terminals, means for preventing energy reflected by said impedance from entering said first echo path, and means for preventing unreflected energy in said main path from entering said second echo path.

2. A distortion corrector in accordance with claim 1 which includes means for adjusting the transmission loss in one of said echo paths relative to that in said main path.

3. A distortion corrector in accordance with claim 1 which includes means for adjusting the transmission loss in each of said echo paths relative to that in said main path.

4. A distortion corrector in accordance with claim 1 in which said echo paths have equal transmission losses.

5. A distortion corrector in accordance with claim 1 in which said echo paths have a common portion and said common portion includes means for adjusting the transmission loss.

6. A distortion corrector in accordance with claim 1 which includes a delay device in said second echo path.

7. A distortion corrector in accordance with claim 1 which includes a second delay device in said main path located between said reflecting impedance and said output terminals, and a third delay device in said second echo path, said third delay device having approximately twice the delay of said second delay device.

8. A distortion corrector in accordance with claim 1 which includes two auxiliary echo paths branching, respectively, from said first and second echo paths and means for introducing a phase shift of approximately $\pi/2$ radians in said auxiliary echo paths.

9. A distortion corrector in accordance with claim 8 which includes means for adjusting the transmission loss in said auxiliary echo paths relative to the transmission loss in said first and second echo paths.

10. A distortion corrector in accordance with claim 9 which includes means for adjusting the amplitude of the correction characteristic.

11. A distortion corrector comprising a pair of input terminals, a main transmission path connected to said terminals, a reflecting impedance in said path, a delay device in said path located between said impedance and said terminals, two echo paths branching from said main path at points on the input side of said delay device, means for preventing energy reflected by said impedance from entering one of said echo paths, means for preventing unreflected energy in said main path from entering the other of said echo paths, and means for combining the outputs of said three paths.

12. A distortion corrector in accordance with claim 11 in which the outputs of said echo paths are substantially equal.

13. A distortion corrector in accordance with claim 11 in which said means comprise a hybrid coil.

14. A distortion corrector comprising a pair of input terminals, a main transmission path connected to said terminals, a reflecting impedance in said path, a delay device in said path located between said impedance and said terminals, an echo path branching from said main path at a point on the input side of said delay device, means for preventing unreflected energy in said main path from entering said echo path, an auxiliary delay path branching from said first-mentioned delay path, means for introducing a phase shift of approximately $\pi/2$ radians in said auxiliary echo path, and means for combining the outputs of said three paths.

LEONARD G. ABRAHAM.

REFERENCES CITED

The following references are of record in the file of this patent:

UNITED STATES PATENTS

| Number | Name | Date |
|---|---|---|
| 2,236,134 | Gloess | Mar. 25, 1941 |
| 2,437,313 | Bedford | Mar. 9, 1948 |
| 2,444,063 | Pflieger | June 29, 1948 |
| 2,493,638 | Olson | Jan. 3, 1950 |